United States Patent
Pleet et al.

(10) Patent No.: US 12,444,234 B2
(45) Date of Patent: Oct. 14, 2025

(54) SYSTEM AND METHOD FOR AGE ESTIMATION

(71) Applicant: Innovasoft Tech Holdings Ltd, Nicosia (CY)

(72) Inventors: Jordan Pleet, Montreal (CA); Jose Maria Mateos Perez, Montreal (CA); Jonathan Alexander Garry, Montreal (CA); Bertrand Chapleau, Montreal (CA); Olivier Hillman Beauchesne, Montreal (CA)

(73) Assignee: Innovasoft Tech Holdings Ltd, Nicosia (CY)

( * ) Notice: Subject to any disclaimer, the term of this patent is extended or adjusted under 35 U.S.C. 154(b) by 0 days.

(21) Appl. No.: 18/383,292

(22) Filed: Oct. 24, 2023

(65) Prior Publication Data
US 2024/0144720 A1 May 2, 2024

Related U.S. Application Data

(60) Provisional application No. 63/419,605, filed on Oct. 26, 2022.

(51) Int. Cl.
*G06V 40/16* (2022.01)
*G06V 10/74* (2022.01)
(Continued)

(52) U.S. Cl.
CPC .......... *G06V 40/178* (2022.01); *G06V 10/761* (2022.01); *G06V 10/762* (2022.01);
(Continued)

(58) Field of Classification Search
CPC .. G06V 10/761; G06V 10/762; G06V 10/776; G06V 20/46; G06V 40/172; G06V 40/174; G06V 40/178
See application file for complete search history.

(56) References Cited

U.S. PATENT DOCUMENTS

| 7,912,246 B1 | 3/2011 | Moon et al. |
| 8,831,362 B1 | 9/2014 | Steffens |

(Continued)

FOREIGN PATENT DOCUMENTS

| WO | 2020/238321 A1 | 12/2020 |
| WO | 2021/082087 A1 | 5/2021 |

OTHER PUBLICATIONS

Song, Z. et al. (2011). "Learning Universal Multi-view Age Estimator by Video Contexts," International Conference on Computer Vision, IEEE; 8 pages.

(Continued)

*Primary Examiner* — Michael J Vanchy, Jr.
(74) *Attorney, Agent, or Firm* — Michele V. Frank; Venable LLP

(57) ABSTRACT

Systems, methods, and computer-readable storage media for age estimation/classification, and more specifically to estimating/classifying the ages of people appearing within videos. Systems configured as disclosed herein can receive a video, then identify multiple facial images for each individual captured within the video. The system can create embeddings of the facial images, then cluster those images together based on distances between the corresponding embeddings. The system can also execute a matchability algorithm on those facial images, determining which of the images provides the clearest image of the individual(s), and can then estimate the age of the individual(s) using the best matchability images and/or send the best matchability image for each individual to a third party for analysis.

20 Claims, 6 Drawing Sheets

(51) Int. Cl.
*G06V 10/762* (2022.01)
*G06V 10/776* (2022.01)
*G06V 20/40* (2022.01)

(52) U.S. Cl.
CPC ............ *G06V 10/776* (2022.01); *G06V 20/46* (2022.01); *G06V 40/172* (2022.01); *G06V 40/174* (2022.01)

(56) References Cited

U.S. PATENT DOCUMENTS

| | | | |
|---|---|---|---|
| 9,152,886 | B2 | 10/2015 | Sakai |
| 10,558,908 | B2 | 2/2020 | Wang et al. |
| 11,151,386 | B1* | 10/2021 | Aggarwal ............... H04N 21/84 |
| 11,216,697 | B1* | 1/2022 | Shen .................... G06V 40/168 |
| 12,087,086 | B2* | 9/2024 | Mittelstaedt ......... G06V 40/171 |
| 2015/0332087 | A1 | 11/2015 | Joshi et al. |
| 2017/0083753 | A1 | 3/2017 | Friedland |
| 2018/0101540 | A1 | 4/2018 | Stoop et al. |
| 2018/0150684 | A1* | 5/2018 | Wang ................... G06V 10/454 |
| 2020/0327311 | A1* | 10/2020 | Xu ........................... G06N 3/08 |
| 2022/0189193 | A1 | 6/2022 | Wang et al. |
| 2022/0383619 | A1 | 12/2022 | Porat et al. |
| 2022/0383660 | A1 | 12/2022 | Porat et al. |
| 2023/0069436 | A1 | 3/2023 | Meng et al. |
| 2023/0317114 | A1 | 10/2023 | Peer et al. |

OTHER PUBLICATIONS

Zhang, B. et al., (Apr. 25, 2022). "Age Estimation of Faces in Videos Using Head Pose Estimation and Convolutional Neural Networks," Sensors, 22, 11: 4171; retrived at <https://www.mdpi.com/1424-8220/22/11/4171>; 12 pages.

International Search Report and Written Opinion mailed Dec. 6, 2023, directed to International Patent Application No. PCT/IB2023/060774; 9 pages.

* cited by examiner

SYSTEM AND METHOD FOR AGE ESTIMATION

PRIORITY

The present application claims priority to U.S. Provisional Patent Application No. 63/419,605, filed Oct. 26, 2022, the entire contents of which are incorporated herein by reference in its entirety.

BACKGROUND

1. Technical Field

The present disclosure relates to age estimation, and more specifically to estimating the ages of people appearing within videos.

2. Introduction

Estimating age of people appearing within video content is important both in the prevention of underage individuals uploading content and in the prevention of uploading and/or trafficking underage video content.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: receiving, at a computer system, a video; extracting, via at least one processor of the computer system, periodic frames from the video, resulting in a plurality of frames; performing, via the at least one processor, facial detection on the plurality of frames, resulting in a plurality of faces; executing, via the at least one processor, an embedding algorithm on the plurality of faces, resulting in a plurality of embeddings corresponding to the plurality of faces; executing, via the at least one processor, a matchability algorithm on the plurality of faces, resulting in a plurality of matchability scores of the plurality of faces; clustering, via the at least one processor, the plurality of faces based on similarity scores of the plurality of embeddings, resulting in at least one cluster of faces; executing, via the at least one processor, an age classifier algorithm on the at least one cluster of faces, resulting in an age classification; identifying, within the at least one cluster of younger classified faces, a best facial image based on the plurality of matchability scores; and transmitting, from the computer system to a third party, an age estimation request, the age estimation request comprising the best facial image and a request to estimate an age of an individual corresponding to the best younger classified facial image.

Another exemplary method could include: receiving, at a computer system, a video; and performing age estimation of individuals captured within the video.

Yet another exemplary method can include: receiving, at a computer system, a video, the video having a plurality of frames; performing, via at least one processor of the computer system, facial detection on the plurality of frames, resulting in a plurality of facial images; executing, via the at least one processor, a matchability algorithm on the plurality of facial images, resulting in a plurality of matchability scores, each matchability score in the plurality of matchability scores corresponding to an image within the plurality of facial images; executing, via the at least one processor, an embedding algorithm on the plurality of facial images, resulting in a plurality of embeddings, each embedding in the plurality of embeddings corresponding to an image within the plurality of facial images; calculating, via the at least one processor, distances between the plurality of embeddings, resulting in a Euclidean distance matrix; clustering, via the at least one processor, the plurality of embeddings using the Euclidean distance matrix, resulting in at least one cluster of embeddings; identifying, within the plurality of facial images, a best facial image for each cluster in the at least one cluster of embeddings based on the plurality of matchability scores; and transmitting, from the computer system to a third party, an age estimation request, the age estimation request comprising the best facial image of an individual and a request to estimate an age of the individual corresponding to the best facial image.

A system configured to perform the concepts disclosed herein can include: at least one processor; and a non-transitory computer-readable storage medium having instructions stored which, when executed by the at least one processor, cause the at least one processor to perform operations comprising: receiving a video, the video having a plurality of frames; performing facial detection on the plurality of frames, resulting in a plurality of facial images; executing a matchability algorithm on the plurality of facial images, resulting in a plurality of matchability scores, each matchability score in the plurality of matchability scores corresponding to an image within the plurality of facial images; executing an embedding algorithm on the plurality of facial images, resulting in a plurality of embeddings, each embedding in the plurality of embeddings corresponding to an image within the plurality of facial images; calculating distances between the plurality of embeddings, resulting in a Euclidean distance matrix; clustering the plurality of embeddings using the Euclidean distance matrix, resulting in at least one cluster of embeddings; identifying, within the plurality of facial images, a best facial image for each cluster in the at least one cluster of embeddings based on the plurality of matchability scores; and transmitting, to a third party, an age estimation request, the age estimation request comprising the best facial image of an individual and a request to estimate an age of the individual corresponding to the best facial image.

A non-transitory computer-readable storage medium configured as disclosed herein can have instructions stored which, when executed by at least one processor, cause the at least one processor to perform operations which include: receiving a video, the video having a plurality of frames; performing facial detection on the plurality of frames, resulting in a plurality of facial images; executing a matchability algorithm on the plurality of facial images, resulting in a plurality of matchability scores, each matchability score in the plurality of matchability scores corresponding to an image within the plurality of facial images; executing an embedding algorithm on the plurality of facial images, resulting in a plurality of embeddings, each embedding in the plurality of embeddings corresponding to an image within the plurality of facial images; calculating distances between the plurality of embeddings, resulting in a Euclidean distance matrix; clustering the plurality of embeddings using the Euclidean distance matrix, resulting in at least one cluster of embeddings; identifying, within the plurality of facial images, a best facial image for each cluster in the at least one cluster of embeddings based on the plurality of matchability scores; and transmitting, to a third party, an age estimation request, the age estimation request comprising the best facial image of an individual and a request to estimate an age of the individual corresponding to the best facial image.

DETAILED DESCRIPTION

Figure 1:
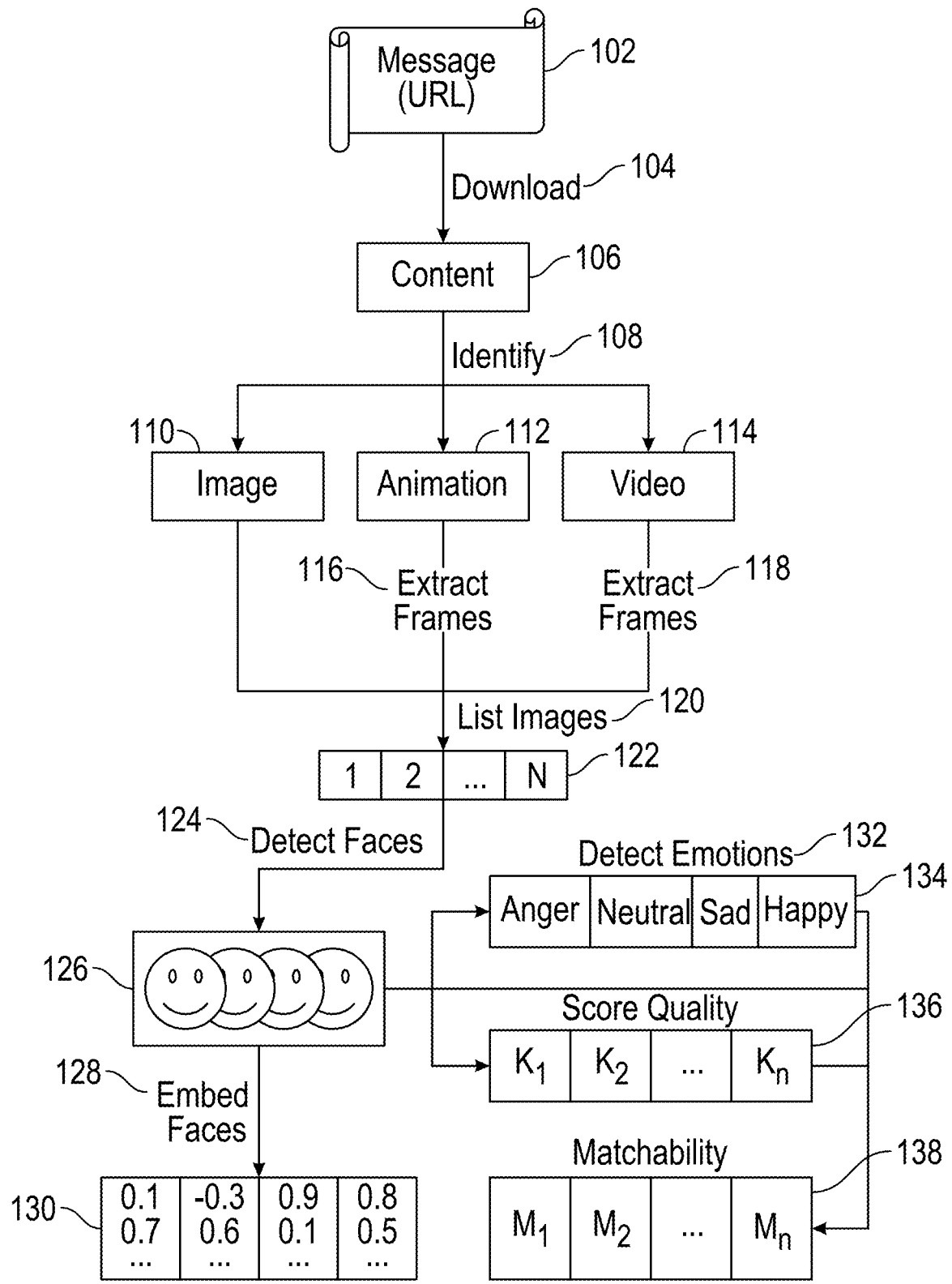
FIG. 1 illustrates an example of a first portion of an age estimation process.

Various embodiments of the disclosure are described in detail below. While specific implementations are described, this is done for illustration purposes only. Other components and configurations may be used without parting from the spirit and scope of the disclosure.

Video sharing websites (such as, but not limited to YOUTUBE, RUMBLE, and VIMEO) allow users to upload videos to a centralized platform, while also allowing users to view and/or download uploaded content. Moderating the content on such video distribution websites is a difficult technical task. At a certain point, the amount of content being uploaded is too extensive for human moderation—there needs to be some automatic detection of prohibited content.

Prohibiting content from certain platforms based on ages of the individuals captured within the video or images is a further technical challenge. Some video distribution systems may allow for videos containing people of all ages, then remove those videos containing prohibited content (e.g., allow a video of a child's birthday party, but delete any videos containing child pornography). Other video distribution systems, like those described herein, may inhibit or prohibit all videos of people below a certain age.

Systems configured as described herein can execute an age estimation for individuals detected within video, animation, and/or images, and, if the age estimation is below a predetermined threshold age (e.g., 18 years old, or 25 years old) prohibit the content from being uploaded, distributed, and/or otherwise shared. In some configurations, if the age estimate is below the threshold the system can flag the content for additional human review.

Exemplary, non-limiting steps taken by the system to perform the age estimation can include, upon receiving video, animation, animated image, or image requiring age estimation, or upon receiving a message indicating that age estimation needs to occur, can include:

1. Download and extract frames
2. Detect faces within the extracted frames, resulting in facial images
3. Calculate detection matchability of the facial images (i.e., the likelihood that a matching image will be found)
4. Embed the detected facial images
5. Cluster the facial image embeddings so the facial images of each individual detected are identified as illustrating a common individual
6. In-house age classification of each individual
7. Third-party age estimation using the best image of a given individual based on the matchability score The application considers each of these steps in turn.

1) Download and Extract Frames

The content is downloaded to the system and the file type (e.g., image, animation, video) can be identified. For animations, all unique frames (e.g., determined by a file integrity algorithm, such as the MD5 algorithm (Message-Digest Algorithm 5), of each frame) can be extracted and saved to file. For videos, frames can be periodically extracted (e.g., one frame every second, one frame every half second, etc.) and saved to a file. After extraction, the system has a list of all saved frames or (if the content is an image and not a video) a list of the single image file.

2) Detect Faces

In this step, the list of frames (or a single image) can be passed through an MTCNN (Multi-Task Cascaded Convolutional Neural Network) face detection model. If faces are detected in an image, the MTCNN model can return:

Bounding boxes
Detection scores
Facial landmarks

The bounding boxes can give the location of the face in the image to be cropped, as well as the dimensions of the bounding boxes, which can yield the size (i.e., area) of the detected face.

The detection scores (e.g., 0-1) can indicate the model prediction as to whether the detected object is a face (e.g., 1 being near certainty that the detected object is a face, and 0 being near certainty that the detected object is not a face). To reduce false positive face detections, only detection scores above a threshold (e.g., 0.7, or another threshold) can be considered good face detections. Such determination of a detection can be based on the detection of facial landmarks, their relative sizes, the distances/angles between those facial landmarks, etc. Non-limiting examples of facial landmarks can include the location of eyes, nose, mouth, ears, etc. With these facial landmark points identified, the bounding boxes around the face can be generated, resulting in a facial image, and the angle of the face—from side portrait to front facing—can be calculated. The angle of the face can be output for future usage. The facial landmark points can also be used to align any rotated faces.

Consider if there is a single individual captured in a video. Each frame of the video may contain a distinct image of the individual's face. The system can capture all of those facial images. Likewise, if there are multiple individuals captured in the video, each frame may contain multiple facial images (e.g., a first facial image corresponding to the face of a first individual captured in a first bound box, and a second facial image corresponding to the face of a second individual captured in a second bound box). In this manner, all facial images, from every frame, can be captured. Alternatively, in some configurations the system may capture facial images from a subset of the possible frames (e.g., every other frame, every five seconds, etc.).

3) Calculate Detection Matchability

A score can be predicted on the quality of the facial images captured, with the score termed "matchability."

While the MTCNN can return a score indicating a probability that the image within a frame/image is a face, the MTCNN can also detect how useful the image is for age estimation/classification. That is, because some well-detected faces are not practical for age estimation/classification, the system can score the detected faces for utility in age estimation and/or classification. Ideal faces for age estimation/classification are passport-like, in which the face is front facing, bigger, clearer, and has neutral expressions. To score matchability, the system first generates additional information for each cropped face. This additional information can then be used by a machine learning model to score a given face's matchability.

For example, the system can generate, using the detected faces an image quality score and/or an emotion score (or emotion scores). The image quality score can, for example, be based on image clearness (or blurriness) of the face crops, where the image clearness is measured with an Image Quality Assessment (IQ) model, such as (but not limited to) the KonIQ-10k Quality model. The emotion scores can, for example, be generated by greyscaling the face cropped images, then entering those greyscaled face cropped images into a Facial Emotion Recognition (FER) model (such as, but not limited to, a FER+ Emotion model). The result from a FER model can be, for example, a vector of scores for eight emotions: neutral, happiness, surprise, sadness, anger, disgust, fear, and contempt. The vectors can be used to represent facial expressions, though other types of scores from other models are likewise possible.

With this additional information, faces detected by the system described herein can have the following features:
  Bounding box area (i.e., the geometrical bounds of the box)
  Detection score (i.e., how certain the system is that a face is detected based on landmarks and relative positioning of those landmarks)
  Face angle (i.e., frontal to portrait)
  Image quality score
  Emotion scores A machine learning model can then be executed by the system to score the "matchability" of a face using one or more of these features (i.e., one or more of the bounding box area, the detection score, the face angle, the image quality score, and the emotion score(s)), where the matchability score classifies the ability of the features of a cropped face to match faces. To train the machine learning model, the system can have a dataset of faces of known actors matched to a database of faces. If the best matches are the same actors, the detection features of the queried faces can be considered good. Otherwise, if the best matches are other actors, the detection features of the queried faces can be considered bad.

4) Embed Faces

The face crops can be processed with an embedding model (such as, but not limited to, FaceNet). The output of the embedding model can be a 512-dimension (or other dimensional count) embedding for each detected face, where more similar faces have more similar embeddings. That is, if a given individual is captured in more than one frame, the multiple facial images of that individual (taken from the multiple frames) will each be processed by the embedding algorithm. While the resulting facial embeddings will not be exactly the same (e.g., due to the individual moving, changing facial expressions, etc.), they will be similar to one another.

5) Cluster Embeddings

As discussed above, for animations and videos, an individual can appear in many frames, resulting in many facial images corresponding to the same individual. As will be discussed below, depending on age estimation/classification of the individual may be performed by the system and/or outsourced to third party systems. Preferably, both the internal and external age estimation/classification of captured individuals are only done once for each individual captured. To accomplish this, and to reduce the load on those the computing systems (e.g., by not processing the same face multiple times), the system calculates which of the faces are likely to belong to the same individual. This calculation is done by measuring the distances between the face embeddings, which can then be clustered based on the measured distances. For example, if the distances between embeddings A and B is small, while the distance between embeddings and embeddings A and C is large, there are likely two distinct individuals, which will result in two clusters of embeddings and associated facial images.

First, a Euclidean distance matrix can be calculated between the embeddings. If distances between faces are within a predetermined threshold, these faces can be connected in an adjacency matrix (meaning the Euclidean distance between the embeddings is within the predetermined threshold), indicating that the faces likely belong to the same individual. In such configurations, the distance threshold cannot be too high or else all faces will be considered as belonging to the same person, resulting in all the faces being connected in the adjacency matrix. To be conservative, a lower threshold can be applied to create fewer connections, thereby not inadvertently considering two distinct individuals to be a single individual. The faces that are connected in the adjacency matrix can be grouped as clusters, with the result that each individual captured within the video will have a corresponding cluster of their facial images.

6) In-House Age Classification

Each embedding can be passed to an in-house age classifier that determines if a face is more likely 25 (or another age) and assigns a value (e.g., between 0 and 1) based on that determination. For example, the system can provide a numerical prediction with indicating how likely it is that the person under analysis is under 25 or over 25 (or another age). If the system were, for example, 70% confident that the person is under 25 years old, the system could assign a classification of 0.7 (or 0.3, depending on the configuration. This classifier can be trained on a dataset with faces split into the two classes, with the threshold determined based on known/labelled data.

For each cluster, the age classification score can be averaged among all the grouped faces within that cluster. For example, if a cluster has multiple embeddings of an individual (each embedding corresponding to a facial image of that individual), each of those embeddings can be classified as described above. Thus, if there were three embeddings, with age classification scores of 0.6, 0.7, and 0.8, the average would be 0.7 for the corresponding individual.

7) Third-Party Age Estimation

If a cluster appears young (i.e., average classification score is above a threshold, or below the threshold depending upon configuration), the best face from the cluster, as determined by the matchability score, can be sent to a third-party provider for secondary confirmation. While in some configurations it is possible to send all the faces that appear young from the in-house age classification, there can be a lot of images, resulting in excessive bandwidth and processing costs. By clustering and sending the best face in the cluster, third-party processing time and costs can be reduced.

The application next turns to the specific examples illustrated in the figures. While many of the illustrated examples use the example of a video, that video can be an animated video or live-action video. Likewise, the examples illustrated and disclosed in the figures can also be applied to an image, with the distinction being the amount of data processed by the system (e.g., a single image rather than images captured in multiple frames or images).

FIG. 1 illustrates an example of a first portion of an age estimation process. In this example, a message 102 is received by the system. Based upon the message 102, the system downloads 104 content 106 (e.g., an image, animation, or video) which was flagged or otherwise identified by the message 102. The system then identifies 108 the type of content 106 downloaded. If the content 106 is an animation 112 or video 114, the system can periodically sample the content, extracting frames in the form of extracted images 116, 118 (or a snapshot, or an individual frame) at each period (e.g., every second, every 0.5 seconds, every other frame, etc.). If the content 106 is an image 110, the identify that only a single image was downloaded. The system can list the images 120 whether in the form of extracted images 116, 118 captured from an animation 112 or a video 114, or from a downloaded image 110. It is noted that the systems, methods, and processes disclosed herein apply equally to animations 112, videos 114, and downloaded images 110. This list of images 120 can, in some configurations, take the form of an array 122.

From the resulting list of images 120, the system can conduct facial detection 124, resulting in a set of cropped faces 126. As illustrated, the set of cropped faces 126 can be converted into an embedding 128 (e.g., a numerical or vector representation), resulting in face embeddings 130 corresponding to the set of cropped faces 126. The set of cropped faces 126 can also be used to detect one or more emotions 132 of the users within each cropped face image, as well as the image quality score 136 of each cropped face image. Non-limiting examples of detectable emotions 134 can include anger, neutral, sad, happy, excited, bored, etc. The image quality scores 136 can quantify, for example, the angle of the face cropped face image with respect to the camera, the number of pixels, the lighting, etc. Using the detected emotions 132, image quality score 136, and/or other features, the system can the matchability scores 138 of the individual images within the set of cropped faces.

Figure 2:
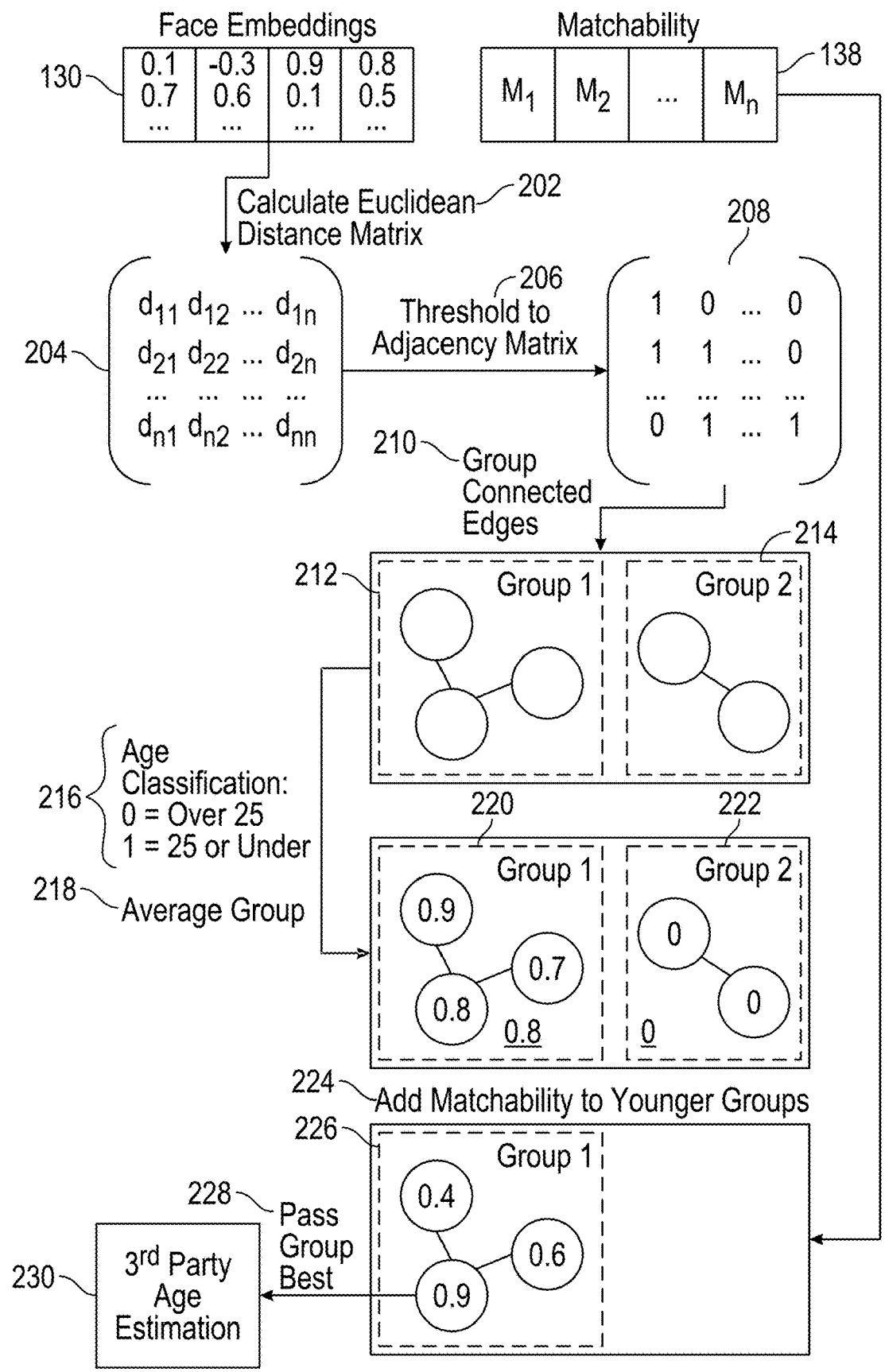
FIG. 2 illustrates an example of a second portion of an age estimation process.

FIG. 2 illustrates an example of a second portion of an age estimation process. Continuing with the face embeddings 130 calculated in FIG. 1, the system can calculate the similarity of the individuals captured in the images, preferably using a Euclidean distance matrix 202, resulting in a matrix of similarity distances 204, then calculate if they are within a threshold 206 distance of one another, resulting in an adjacency matrix 208. The adjacency matrix 208, as illustrated, indicates using binary representations if images are within the threshold distance 206 based on similarities in their face embeddings 130, and that the facial images 136 corresponding to those embeddings 130 should be considered to be the same individual. In other words, the system converts the detected faces 126 into embeddings 130, then measures how similar those embeddings are to one another using a Euclidean distance measurement 202 (in other configurations, other mechanisms for calculating distance can be used). If the distance between embeddings is small enough (i.e., below a threshold), the system considers those embeddings to represent facial images of a single individual, and clusters those closely related images together. As illustrated, the system creates edges 210 between the similar images, resulting in clusters 212, 214, where each cluster represents images associated with unique individuals based on the similarity distances 204.

The system can then execute (on each image within each cluster) a first age estimation and/or classification. The first age classification can, for example, be an in-house age classifier. In the illustrated example, the system is seeking to age classify 216 if the individuals captured are over or under an age threshold (e.g., twenty-five). In some configurations, the system can average the estimated ages for a given cluster, resulting in an average age classification for each group 218 on a scale between 0 and 1 (the scale indicating how confident the system is that they are above or below the threshold). As illustrated, group one 220 has an average age of 0.8 (that is, mostly estimated to be below twenty-five) while group two 222 has an average age of 0.0 (that is, no one is estimated to be below twenty-five).

If the system detects images (or a cluster average) where the estimated age of the individuals within that cluster is below the predetermined threshold, the system can add/combine 224 the cropped face images of that cluster with the corresponding matchability scores 138, resulting in a combination 226 of the matchability scores 138 with the clustered age estimates 220. Based on the clustered age estimates 220, 222 and the matchability scores 138, the system can identify a subset of images (e.g., the best image 228 or images from groups which appear in violation of the age threshold) from the cluster, then send the subset of images (i.e., the best image of the individual in question) to a third party age estimator 230.

If the third party age estimator 230 identifies the face as above the predetermined threshold age, the system can permit the uploading of the content to the system for wider distribution. If the third party age estimator identifies the face as below the predetermined threshold age, or as questionable, the system can flag the content as needing additional human review.

Figure 3:
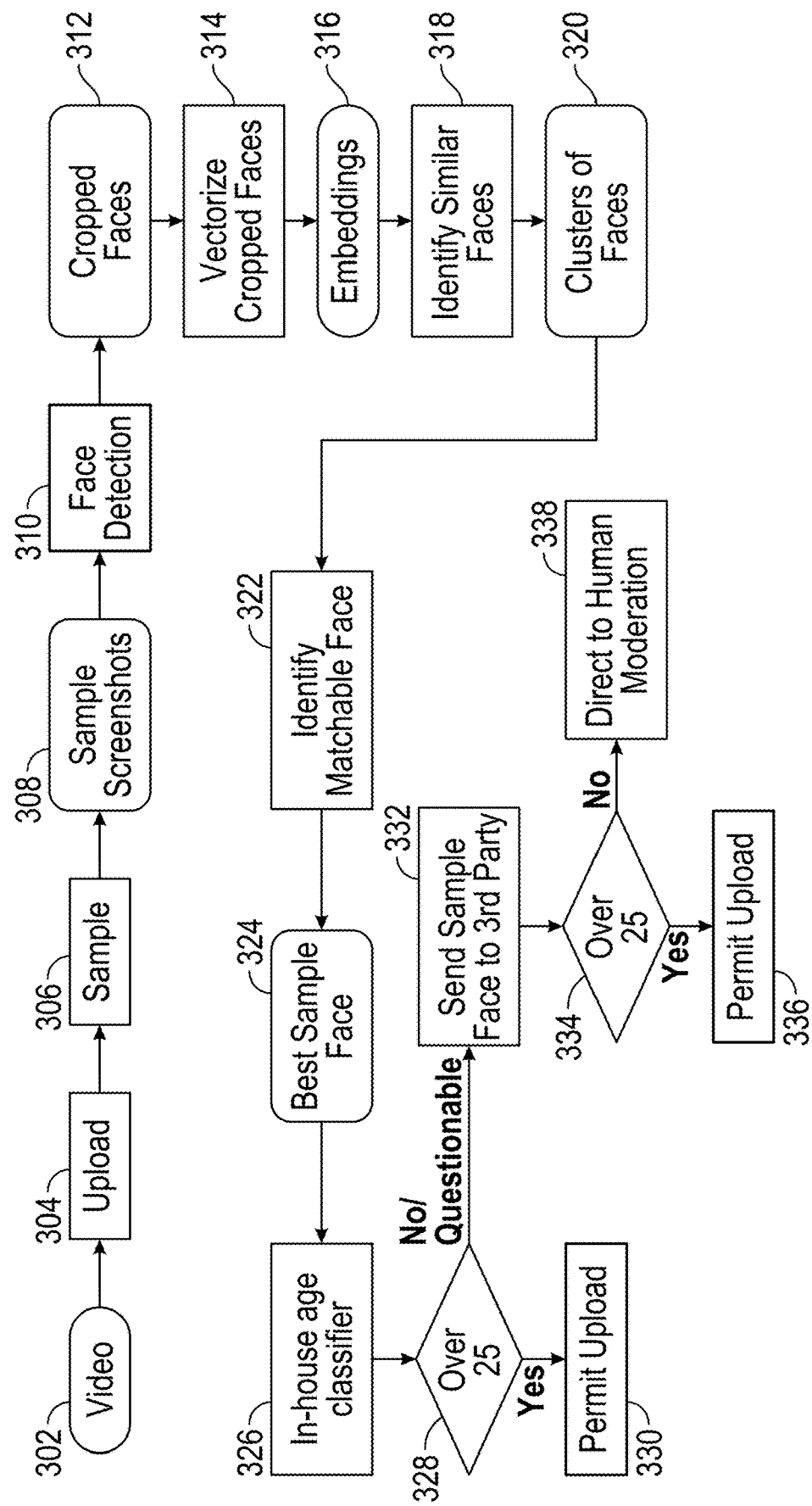
FIG. 3 illustrates an alternative example of an age estimation process.

FIG. 3 illustrates an alternative example of an age estimation process. In this exemplary process, the matchability and the clustering of the cropped faces occurs sequentially, rather than through parallel process. As illustrated, a video 302 is uploaded 304 a video sharing platform, then sampled 306 (e.g., every other frame; every second; every I, P, and/or B frame; etc.), resulting in sample screenshots 308 or frames. Using the sample screenshots 308, the system can execute one or more facial detection algorithms 310, resulting in cropped faces 312 corresponding to the identified faces within the sample screenshots 308. The system can vectorize (embed) the cropped faces 314, resulting in embeddings 316 of the detected faces. The system can then identify similar faces 318 within those embeddings 316 using a distance measurement (such as a Cosine Distance), resulting in clusters of faces 320, each cluster corresponding to a single individual captured within the video 302. From these clusters of faces 320 the system seeks to identify a matchable face 322 (that is, the face that has the highest likelihood of being identified, or of producing a correct age estimate). The best sample face 324 from each cluster of faces 320 is then sent to an in-house age classifier 326, which estimates 328 if the best sample face 324 belongs to an individual above a threshold (e.g., if the individual is over an age limit). If so, the system permits upload 330 of the video 302 to the video sharing platform. If the individual is not over the threshold, or if the age is questionable, the best sample face 324 can be sent to a third party 332, who can do a similar age classification 334 and/or age estimation. If the third party indicates the individual is over the threshold, the video may be uploaded 336, whereas if the third party indicates the individual is not over the threshold, or the analysis is questionable, the video 302 can be directed to human moderation 338.

Figure 4:
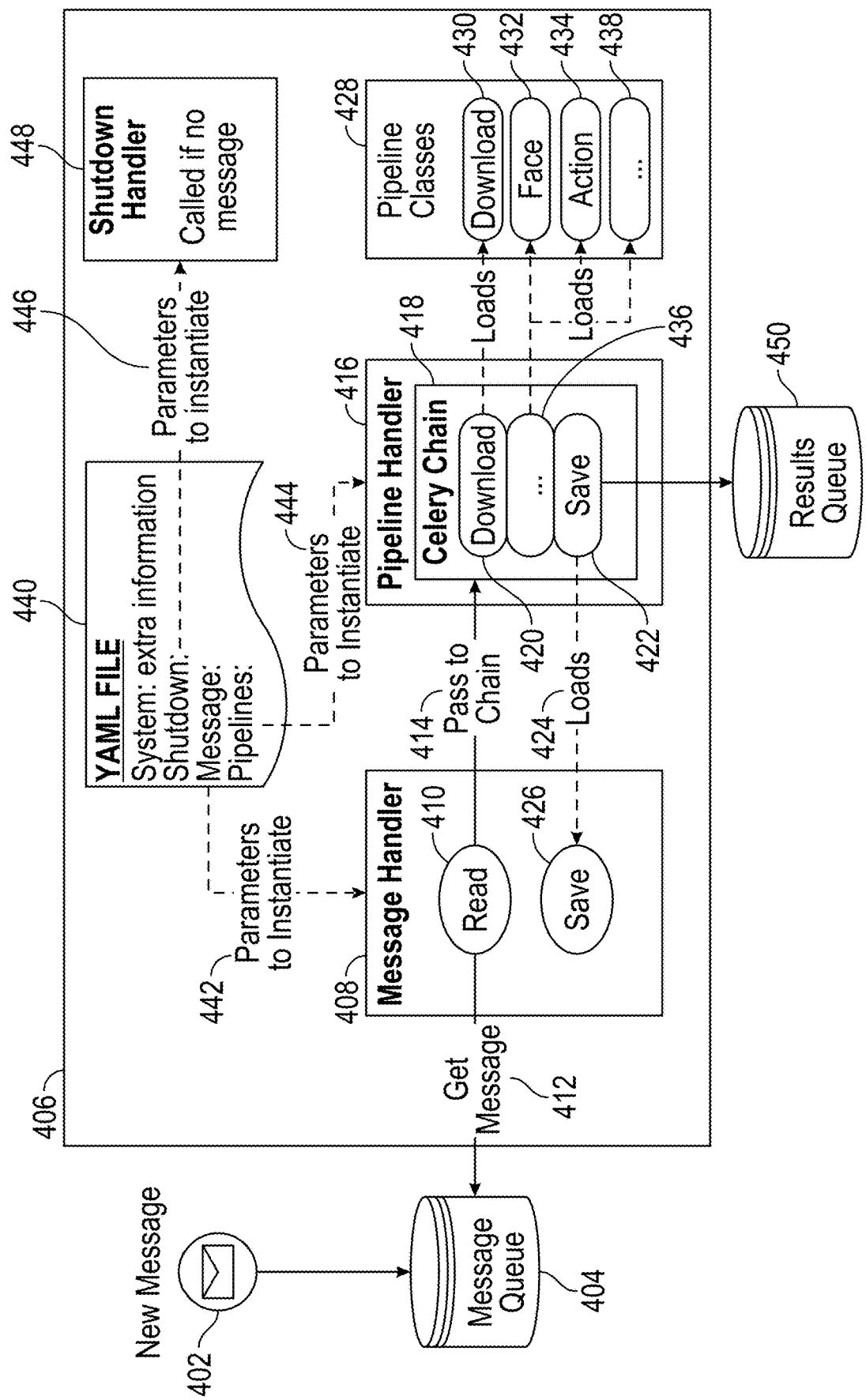
FIG. 4 illustrates an example system.

FIG. 4 illustrates an example system 406. In this example, a message 402 comes in and is placed into a message queue 404. When the system 406 is able to process the message 402 from the message queue 404, the system 406 reads the message using a message handler 408 issuing a get message 412 command (thereby pulling the message 402 from the queue in response to a download initiative 420), reading 410 the message 402 by passing 414 the message 402 to a Celery chain 418 (also known as a Celery work-flow) within a pipeline handler 416. The pipeline handler 416, using the Celery chain 418, can issue commands (such as Load 424 command brought about by a save initiative 422) 424 to the message handler 408 to save 426 messages. The pipeline handler 416, again using the Celery chain 418, can issue commands to various pipeline classes 428, including other commands 436 not expressly identified in the example illustration. Non-limiting examples of these commands can include download 430, face 432 (as in identify the face), action 434 (e.g., take a specific action), or other commands 438 not expressly identified in the example illustration. A YAML (Yet Another Markup Language) file 440 can be used as a configuration file, providing parameters to instantiate 442, 444 the message handler 408 and/or the pipeline handler 416. The YAML file 440 can also be used to provide parameters to instantiate 446 a shutdown handler 448, which can be called if there is no message for the system 406 to handle.

In this example the message 402 says, "perform age estimation on specific video content." The system 406 then performs the age estimation as described above, and further breaks down the specific video content down into different categories (e.g., faces, actions, etc.), with the ability to download, save, or perform other actions on the content. The results are then sent to a results queue 450 as a response to the message 402.

Figure 5:
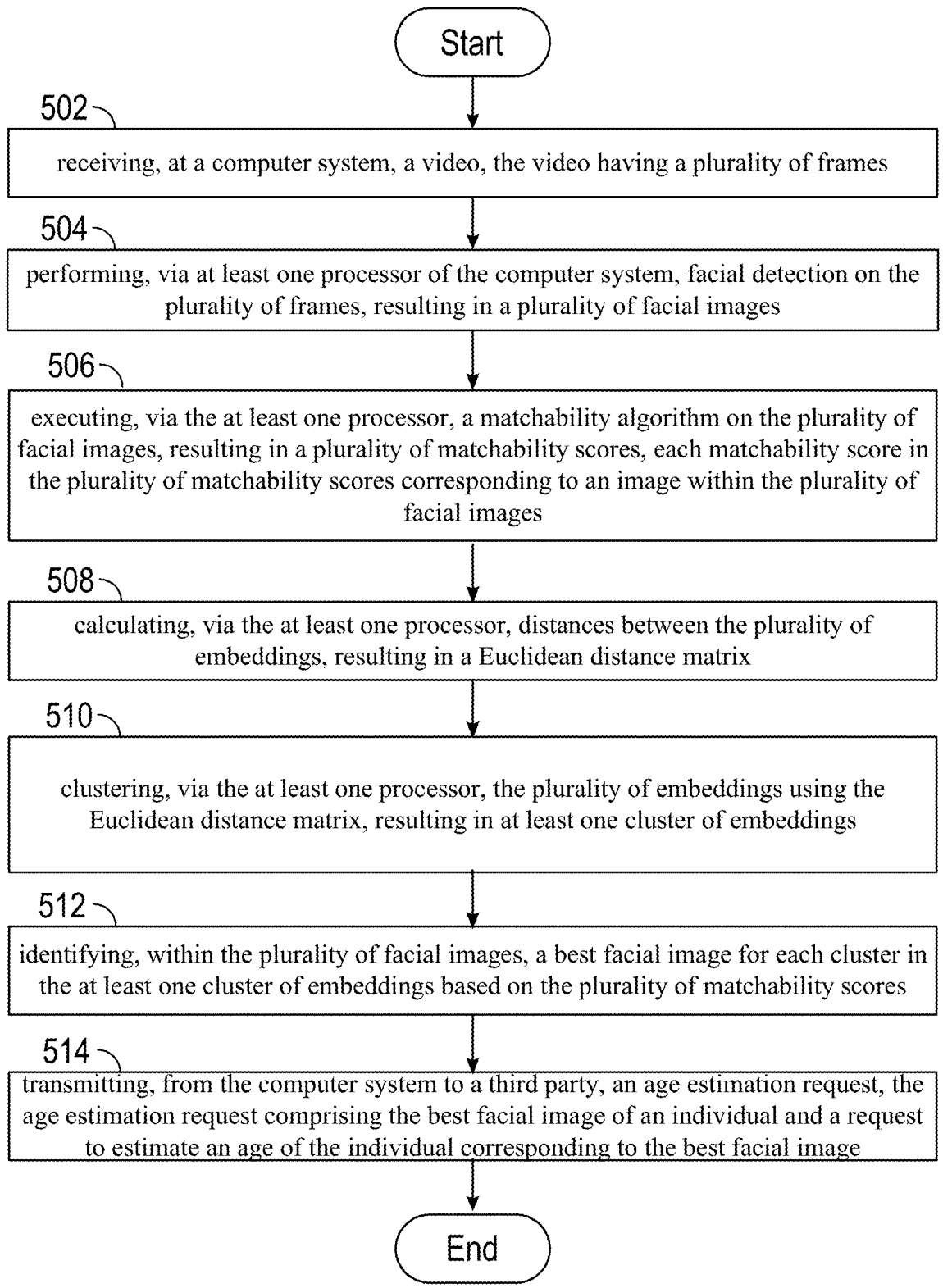
FIG. 5 illustrates an example method embodiment.

FIG. 5 illustrates an exemplary method embodiment. As illustrated, the method can include receiving, at a computer system, a video, the video having a plurality of frames (502), and performing, via at least one processor of the computer system, facial detection on the plurality of frames, resulting in a plurality of facial images (504). While the illustrated method states a video, that video can be an animated video or live-action video. Likewise, the processes illustrated and disclosed with respect to FIG. 5 can also be applied to an image, with the distinction being the amount of data processed by the system (e.g., a single image rather than images captured in multiple frames or images). The system can execute, via the at least one processor, a matchability algorithm on the plurality of facial images, resulting in a plurality of matchability scores, each matchability score in the plurality of matchability scores corresponding to an image within the plurality of facial images (506), and execute, via the at least one processor, an embedding algorithm on the plurality of facial images, resulting in a plurality of embeddings, each embedding in the plurality of embeddings corresponding to an image within the plurality of facial images (508). The system can then calculate, via the at least one processor, distances between the plurality of embeddings, resulting in a Euclidean distance matrix (510), and cluster, via the at least one processor, the plurality of embeddings using the Euclidean distance matrix, resulting in at least one cluster of embeddings (512). In general, each cluster within the at least one cluster of embeddings will have embeddings associated with a single individual captured in the video, though in some instances (such as twins or people with similar faces) multiple individuals may have their faces clustered together. The system can then identify, within the plurality of facial images, a best facial image for each cluster in the at least one cluster of embeddings based on the plurality of matchability scores (514), and transmit, from the computer system to a third party, an age estimation request, the age estimation request comprising the best facial image of an individual and a request to estimate an age of the individual corresponding to the best facial image.

In some configurations, the identifying of the best facial image for each individual captured in the video can further include: extracting, via the at least one processor of the computer system, at least two frames from the video, resulting in a plurality of frames; and executing, via the at least one processor, the facial detection on each frame the plurality of frames, resulting in the plurality of facial images.

In some configurations, the executing of the matchability algorithm can include generating, for each facial image in the plurality of facial images, emotion scores, wherein the emotion scores are used to compute the plurality of matchability scores. In such configurations, the emotion scores can include, for each facial image in the plurality of facial images, a vector of scores for emotions comprising: happiness, surprise, sadness, anger, disgust, fear, and/or contempt.

In some configurations, the executing of the matchability algorithm can include generating, for each facial image in the plurality of facial images, a facial angle, wherein the facial angle can be used to compute the plurality of matchability scores.

In some configurations, the illustrated method can further include: executing, via the at least one processor, an internal age classification algorithm on the at least one cluster of embeddings, resulting in an age classification for each individual appearing in the video, prior to the transmitting of the age estimation request, where the transmitting of the age estimation request can be modified based on the age classification of each individual appearing in the video. In such configurations, the internal age classification algorithm can use the plurality of embeddings to estimate an age of each individual appearing in the video.

Figure 6:
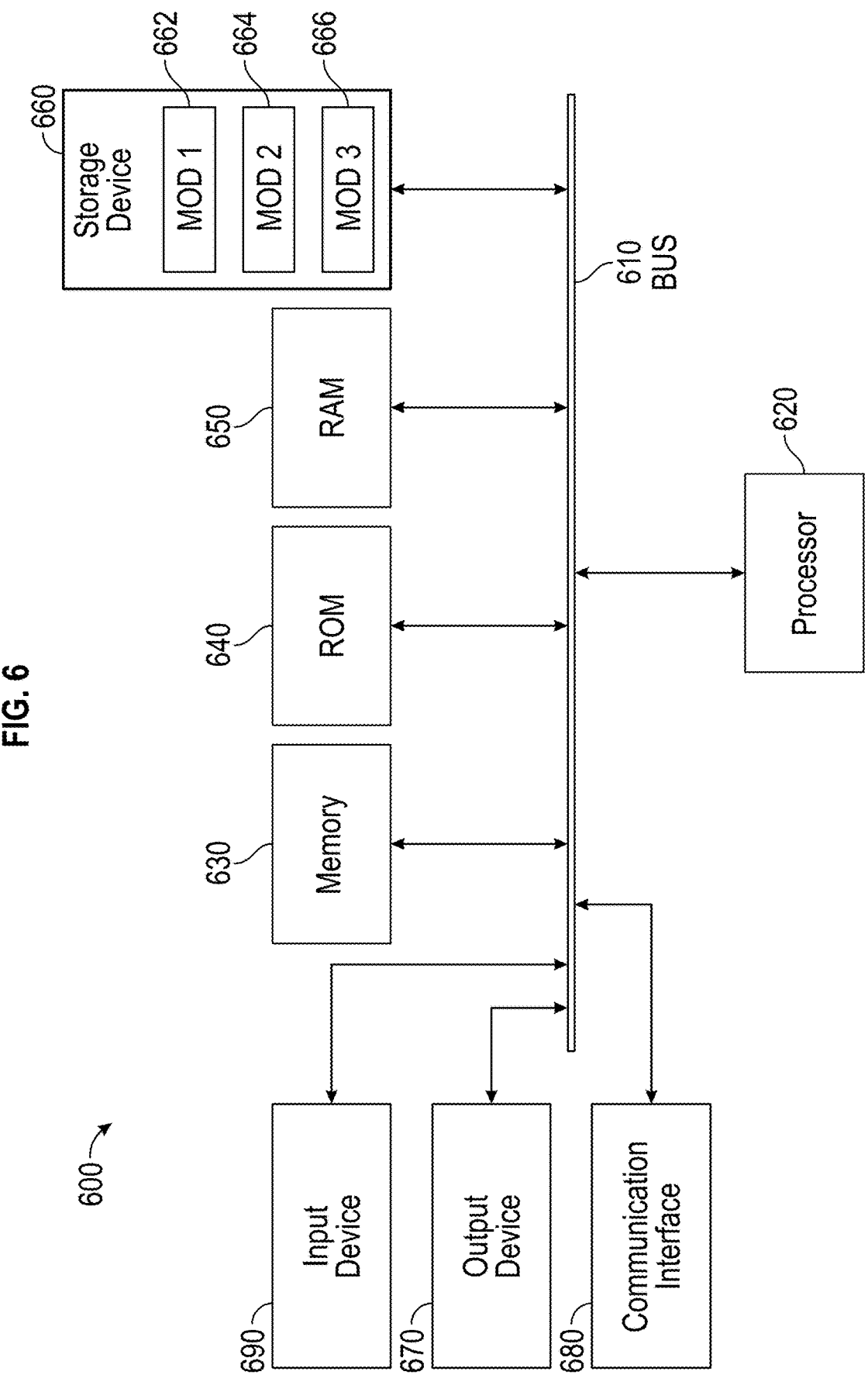
FIG. 6 illustrates an example computer system.

With reference to FIG. 6, an exemplary system includes a computing device 600, including a processing unit (CPU or processor) 620 and a system bus 610 that couples various system components including the system memory 650 such as read-only memory (ROM) 640 and random-access memory (RAM) 650 to the processor 620. The computing device 600 can include a cache of high-speed memory connected directly with, in close proximity to, or integrated as part of the processor 620. The computing device 600 copies data from the RAM 650 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The RAM 650 can include multiple different types of memory with different performance characteristics. It can be appreciated that the disclosure may operate on a computing device 600 with more than one processor 620 or on a group or cluster of computing devices networked together to provide greater processing capability. The processor 620 can include any general-purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, system bus 610, output device 670 (such as a display), and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the storage device 660 (such as a hard disk), other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

Further aspects of the present disclosure are provided by the subject matter of the following clauses.

A method comprising: receiving, at a computer system, a video; extracting, via at least one processor of the computer system, periodic frames from the video, resulting in a plurality of frames; performing, via the at least one processor, facial detection on the plurality of frames, resulting in a plurality of faces; executing, via the at least one processor, an embedding algorithm on the plurality of faces, resulting in a plurality of embeddings corresponding to the plurality of faces; executing, via the at least one processor, a matchability algorithm on the plurality of faces, resulting in a plurality of matchability scores of the plurality of faces; clustering, via the at least one processor, the plurality of faces based on similarity scores of the plurality of embeddings, resulting in at least one cluster of faces; executing, via the at least one processor, an age classifier algorithm on the at least one cluster of faces, resulting in at least one age classification; identifying, within the at least one younger cluster of faces, a best facial image based on the plurality of matchability scores; and transmitting, from the computer system to a third party, an age estimation request, the age estimation request comprising the best facial image and a request to estimate an age of an individual corresponding to the best facial image.

A method comprising: receiving, at a computer system, a video; and performing age estimation of individuals captured within the video.

A method comprising: receiving, at a computer system, a video, the video having a plurality of frames; performing, via at least one processor of the computer system, facial detection on the plurality of frames, resulting in a plurality of facial images; executing, via the at least one processor, a matchability algorithm on the plurality of facial images, resulting in a plurality of matchability scores, each matchability score in the plurality of matchability scores corresponding to an image within the plurality of facial images; executing, via the at least one processor, an embedding algorithm on the plurality of facial images, resulting in a plurality of embeddings, each embedding in the plurality of embeddings corresponding to an image within the plurality of facial images; calculating, via the at least one processor, distances between the plurality of embeddings, resulting in a Euclidean distance matrix; clustering, via the at least one processor, the plurality of embeddings using the Euclidean distance matrix, resulting in at least one cluster of embeddings; identifying, within the plurality of facial images, a best facial image for each cluster in the at least one cluster of embeddings based on the plurality of matchability scores; and transmitting, from the computer system to a third party, an age estimation request, the age estimation request comprising the best facial image of an individual and a request to estimate an age of the individual corresponding to the best facial image.

The method of any preceding clause, wherein the identifying of the best facial image for each individual captured in the video further comprises: extracting, via the at least one processor of the computer system, at least two frames from the video, resulting in a plurality of frames; and executing, via the at least one processor, the facial detection on each frame the plurality of frames, resulting in the plurality of facial images.

The method of any preceding clause, wherein executing of the matchability algorithm comprises generating, for each facial image in the plurality of facial images, emotion scores, wherein the emotion scores are used to compute the plurality of matchability scores.

The method of any preceding clause, wherein the emotion scores comprise, for each facial image in the plurality of facial images, a vector of scores for emotions comprising: happiness, surprise, sadness, anger, disgust, fear, and contempt.

The method of any preceding clause, wherein executing of the matchability algorithm comprises generating, for each facial image in the plurality of facial images, a facial angle, wherein the facial angle is used to compute the plurality of matchability scores.

The method of any preceding clause, further comprising: executing, via the at least one processor, an internal age classification algorithm on the at least one cluster of embeddings, resulting in an age classification for each individual appearing in the video, prior to the transmitting of the age estimation request, wherein the transmitting of the age estimation request is modified based on the age classification of each individual appearing in the video.

The method of any preceding clause, wherein the internal age classification algorithm uses the plurality of embeddings to estimate an age of each individual appearing in the video.

A system comprising: at least one processor; and a non-transitory computer-readable storage medium having instructions stored which, when executed by the at least one processor, cause the at least one processor to perform operations comprising: receiving a video, the video having a plurality of frames; performing facial detection on the plurality of frames, resulting in a plurality of facial images; executing a matchability algorithm on the plurality of facial images, resulting in a plurality of matchability scores, each matchability score in the plurality of matchability scores corresponding to an image within the plurality of facial images; executing an embedding algorithm on the plurality of facial images, resulting in a plurality of embeddings, each embedding in the plurality of embeddings corresponding to an image within the plurality of facial images; calculating distances between the plurality of embeddings, resulting in a Euclidean distance matrix; clustering the plurality of embeddings using the Euclidean distance matrix, resulting in at least one cluster of embeddings; identifying, within the plurality of facial images, a best facial image for each cluster in the at least one cluster of embeddings based on the plurality of matchability scores; and transmitting, to a third party, an age estimation request, the age estimation request comprising the best facial image of an individual and a request to estimate an age of the individual corresponding to the best facial image.

The system of any preceding clause, wherein the identifying of the best facial image for each individual captured in the video further comprises: extracting at least two frames from the video, resulting in a plurality of frames; and executing, via the at least one processor, the facial detection on each frame the plurality of frames, resulting in the plurality of facial images.

The system of any preceding clause, wherein executing of the matchability algorithm comprises generating, for each facial image in the plurality of facial images, emotion scores, wherein the emotion scores are used to compute the plurality of matchability scores.

The system of any preceding clause, wherein the emotion scores comprise, for each facial image in the plurality of facial images, a vector of scores for emotions comprising: happiness, surprise, sadness, anger, disgust, fear, and contempt.

The system of any preceding clause, wherein executing of the matchability algorithm comprises generating, for each facial image in the plurality of facial images, a facial angle, wherein the facial angle is used to compute the plurality of matchability scores.

The system of any preceding clause, the non-transitory computer-readable storage medium having additional instructions stored which, when executed by the at least one processor, cause the at least one processor to perform operations comprising: executing an internal age classification algorithm on the at least one cluster of embeddings, resulting in an age classification for each individual appearing in the video, prior to the transmitting of the age estimation request, wherein the transmitting of the age estimation request is modified based on the age classification of each individual appearing in the video.

The system of any preceding clause, wherein the internal age classification algorithm uses the plurality of embeddings to estimate an age of each individual appearing in the video.

A non-transitory computer-readable storage medium having instructions stored which, when executed by at least one processor, cause the at least one processor to perform operations comprising: receiving a video, the video having a plurality of frames; performing facial detection on the plurality of frames, resulting in a plurality of facial images; executing a matchability algorithm on the plurality of facial images, resulting in a plurality of matchability scores, each matchability score in the plurality of matchability scores corresponding to an image within the plurality of facial images; executing an embedding algorithm on the plurality of facial images, resulting in a plurality of embeddings, each embedding in the plurality of embeddings corresponding to an image within the plurality of facial images; calculating distances between the plurality of embeddings, resulting in a Euclidean distance matrix; clustering the plurality of embeddings using the Euclidean distance matrix, resulting in at least one cluster of embeddings; identifying, within the plurality of facial images, a best facial image for each cluster in the at least one cluster of embeddings based on the plurality of matchability scores; and transmitting, to a third party, an age estimation request, the age estimation request comprising the best facial image of an individual and a request to estimate an age of the individual corresponding to the best facial image.

The non-transitory computer-readable storage medium of any preceding clause, wherein the identifying of the best facial image for each individual captured in the video further comprises: extracting at least two frames from the video, resulting in a plurality of frames; and executing the facial detection on each frame the plurality of frames, resulting in the plurality of facial images.

The non-transitory computer-readable storage medium of any preceding clause, wherein executing of the matchability algorithm comprises generating, for each facial image in the plurality of facial images, emotion scores, wherein the emotion scores are used to compute the plurality of matchability scores.

The non-transitory computer-readable storage medium of any preceding clause, wherein the emotion scores comprise, for each facial image in the plurality of facial images, a vector of scores for emotions comprising: happiness, surprise, sadness, anger, disgust, fear, and contempt.

The non-transitory computer-readable storage medium of any preceding clause, wherein executing of the matchability algorithm comprises generating, for each facial image in the plurality of facial images, a facial angle, wherein the facial angle is used to compute the plurality of matchability scores.

The non-transitory computer-readable storage medium of any preceding clause, having additional instructions stored which, when executed by the at least one processor, cause the at least one processor to perform operations comprising: executing an internal age classification algorithm on the at least one cluster of embeddings, resulting in an age classification for each individual appearing in the video, prior to the transmitting of the age estimation request, wherein the transmitting of the age estimation request is modified based on the age classification of each individual appearing in the video.

We claim:

1. A method comprising:
   receiving, at a first computer system, a video, the video having a plurality of frames;
   performing, via at least one processor of the first computer system, facial detection on the plurality of frames, resulting in a plurality of facial images;
   executing, via the at least one processor, a matchability algorithm on the plurality of facial images, resulting in a plurality of matchability scores, each matchability score in the plurality of matchability scores corresponding to a likelihood that a matching image will be found within the plurality of facial images;
   executing, via the at least one processor, an embedding algorithm on the plurality of facial images, resulting in a plurality of embeddings, each embedding in the plurality of embeddings corresponding to an image within the plurality of facial images;
   calculating, via the at least one processor, distances between the plurality of embeddings, resulting in a Euclidean distance matrix;
   clustering, via the at least one processor, the plurality of embeddings using the Euclidean distance matrix, resulting in at least one cluster of embeddings;
   identifying, within the plurality of facial images, a best facial image for each cluster in the at least one cluster of embeddings based on the plurality of matchability scores;
   transmitting, from the first computer system to a third party computer system which is distinct from the first computer system, an age estimation request, the age estimation request comprising the best facial image of an individual and a request to estimate an age of the individual corresponding to the best facial image;
   receiving, at the first computer system from the third party computer system, in response to the age estimation request, an indication that the age of the individual corresponding to the best facial image is below a predetermined threshold age; and
   flagging, via the at least one processor, the video for human review based on the indication.

2. The method of claim 1, wherein the identifying of the best facial image for each individual captured in the video further comprises:
   extracting, via the at least one processor of the computer system, at least two frames from the video, resulting in a plurality of frames; and
   executing, via the at least one processor, the facial detection on each frame the plurality of frames, resulting in the plurality of facial images.

3. The method of claim 1, wherein executing of the matchability algorithm comprises generating, for each facial image in the plurality of facial images, emotion scores, wherein the emotion scores are used to compute the plurality of matchability scores.

4. The method of claim 3, wherein the emotion scores comprise, for each facial image in the plurality of facial images, a vector of scores for emotions comprising: happiness, surprise, sadness, anger, disgust, fear, and contempt.

5. The method of claim 1, wherein executing of the matchability algorithm comprises generating, for each facial image in the plurality of facial images, a facial angle, wherein the facial angle is used to compute the plurality of matchability scores.

6. The method of claim 1, further comprising:
   executing, via the at least one processor, an internal age classification algorithm on the at least one cluster of embeddings, resulting in an age classification for each individual appearing in the video, prior to the transmitting of the age estimation request,
   wherein the transmitting of the age estimation request is modified based on the age classification of each individual appearing in the video.

7. The method of claim 6, wherein the internal age classification algorithm uses the plurality of embeddings to estimate an age of each individual appearing in the video.

8. A system comprising:
   at least one processor; and
   a non-transitory computer-readable storage medium having instructions stored which, when executed by the at least one processor, cause the at least one processor to perform operations comprising:
   receiving a video, the video having a plurality of frames;

performing facial detection on the plurality of frames, resulting in a plurality of facial images;

executing a matchability algorithm on the plurality of facial images, resulting in a plurality of matchability scores, each matchability score in the plurality of matchability scores corresponding to a likelihood that a matching image will be found within the plurality of facial images;

executing an embedding algorithm on the plurality of facial images, resulting in a plurality of embeddings, each embedding in the plurality of embeddings corresponding to an image within the plurality of facial images;

calculating distances between the plurality of embeddings, resulting in a Euclidean distance matrix;

clustering the plurality of embeddings using the Euclidean distance matrix, resulting in at least one cluster of embeddings;

identifying, within the plurality of facial images, a best facial image for each cluster in the at least one cluster of embeddings based on the plurality of matchability scores;

transmitting, to a third party computer system which is distinct from the system, an age estimation request, the age estimation request comprising the best facial image of an individual and a request to estimate an age of the individual corresponding to the best facial image;

receiving, from the third party computer system, in response to the age estimation request, an indication that the age of the individual corresponding to the best facial image is below a predetermined threshold age; and flagging the video for human review based on the indication.

9. The system of claim 8, wherein the identifying of the best facial image for each individual captured in the video further comprises:

extracting at least two frames from the video, resulting in a plurality of frames; and executing, via the at least one processor, the facial detection on each frame the plurality of frames, resulting in the plurality of facial images.

10. The system of claim 8, wherein executing of the matchability algorithm comprises generating, for each facial image in the plurality of facial images, emotion scores, wherein the emotion scores are used to compute the plurality of matchability scores.

11. The system of claim 10, wherein the emotion scores comprise, for each facial image in the plurality of facial images, a vector of scores for emotions comprising: happiness, surprise, sadness, anger, disgust, fear, and contempt.

12. The system of claim 8, wherein executing of the matchability algorithm comprises generating, for each facial image in the plurality of facial images, a facial angle, wherein the facial angle is used to compute the plurality of matchability scores.

13. The system of claim 8, the non-transitory computer-readable storage medium having additional instructions stored which, when executed by the at least one processor, cause the at least one processor to perform operations comprising:

executing an internal age classification algorithm on the at least one cluster of embeddings, resulting in an age classification for each individual appearing in the video, prior to the transmitting of the age estimation request, wherein the transmitting of the age estimation request is modified based on the age classification of each individual appearing in the video.

14. The system of claim 13, wherein the internal age classification algorithm uses the plurality of embeddings to estimate an age of each individual appearing in the video.

15. A non-transitory computer-readable storage medium having instructions stored which, when executed by at least one processor, cause the at least one processor to perform operations comprising:

receiving a video, the video having a plurality of frames;

performing facial detection on the plurality of frames, resulting in a plurality of facial images;

executing a matchability algorithm on the plurality of facial images, resulting in a plurality of matchability scores, each matchability score in the plurality of matchability scores corresponding to a likelihood that a matching image will be found within the plurality of facial images;

executing an embedding algorithm on the plurality of facial images, resulting in a plurality of embeddings, each embedding in the plurality of embeddings corresponding to an image within the plurality of facial images;

calculating distances between the plurality of embeddings, resulting in a Euclidean distance matrix;

clustering the plurality of embeddings using the Euclidean distance matrix, resulting in at least one cluster of embeddings;

identifying, within the plurality of facial images, a best facial image for each cluster in the at least one cluster of embeddings based on the plurality of matchability scores; and transmitting, to a third party computer system which is physically separated from the at least one processor, an age estimation request, the age estimation request comprising the best facial image of an individual and a request to estimate an age of the individual corresponding to the best facial image;

receiving, from the third party computer system, in response to the age estimation request, an indication that the age of the individual corresponding to the best facial image is below a predetermined threshold age; and flagging the video for human review based on the indication.

16. The non-transitory computer-readable storage medium of claim 15, wherein the identifying of the best facial image for each individual captured in the video further comprises:

extracting at least two frames from the video, resulting in a plurality of frames; and executing the facial detection on each frame the plurality of frames, resulting in the plurality of facial images.

17. The non-transitory computer-readable storage medium of claim 15, wherein executing of the matchability algorithm comprises generating, for each facial image in the plurality of facial images, emotion scores, wherein the emotion scores are used to compute the plurality of matchability scores.

18. The non-transitory computer-readable storage medium of claim 17, wherein the emotion scores comprise, for each facial image in the plurality of facial images, a vector of scores for emotions comprising: happiness, surprise, sadness, anger, disgust, fear, and contempt.

19. The non-transitory computer-readable storage medium of claim 15, wherein executing of the matchability algorithm comprises generating, for each facial image in the plurality of facial images, a facial angle, wherein the facial angle is used to compute the plurality of matchability scores.

20. The non-transitory computer-readable storage medium of claim 15, having additional instructions stored which, when executed by the at least one processor, cause the at least one processor to perform operations comprising:
    executing an internal age classification algorithm on the at least one cluster of embeddings, resulting in an age classification for each individual appearing in the video, prior to the transmitting of the age estimation request,
    wherein the transmitting of the age estimation request is modified based on the age classification of each individual appearing in the video.

\* \* \* \* \*